Figure 1:
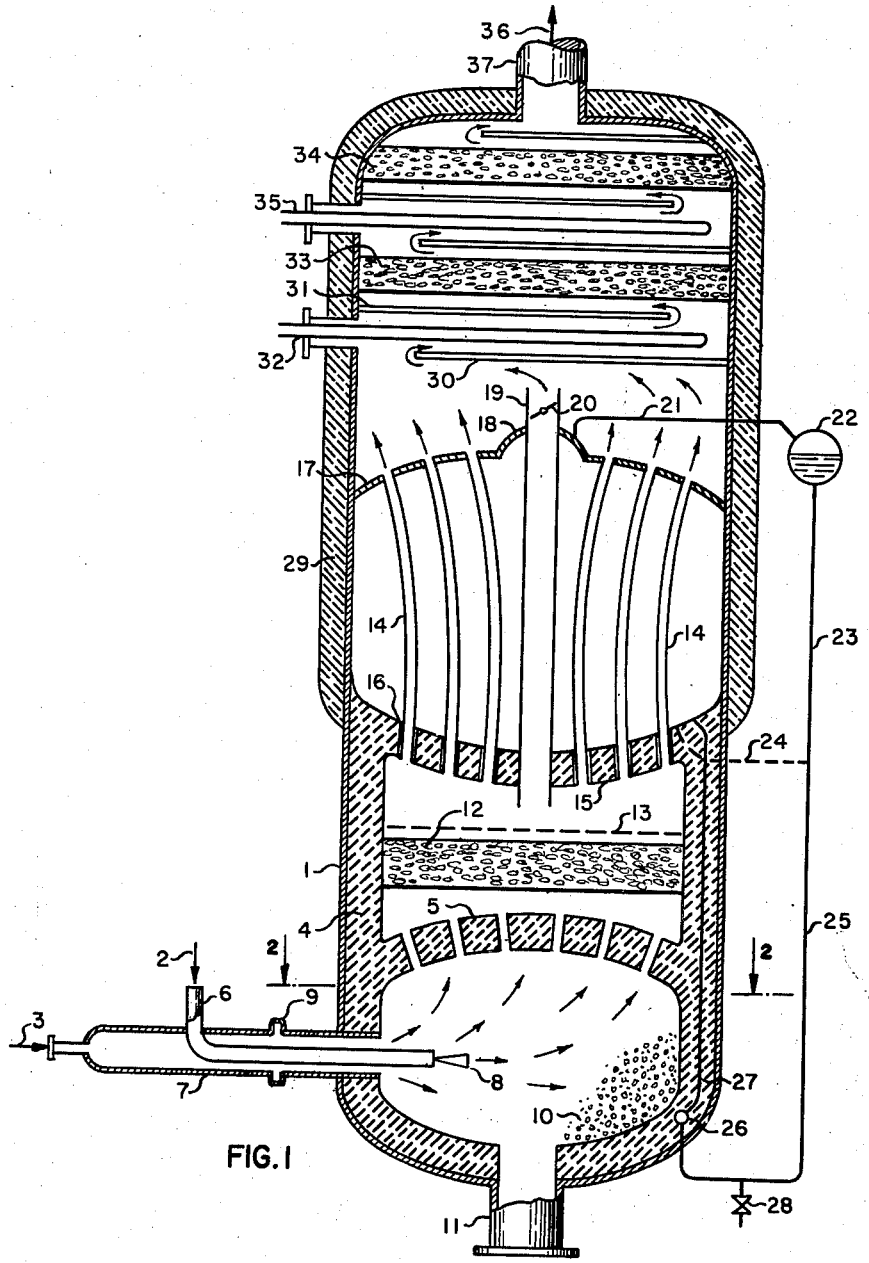

GEORGE RUSSELL JAMES
PAUL KORWIN
*INVENTORS*

BY J. T. Chaboty
*AGENT*

United States Patent Office 3,190,730
Patented June 22, 1965

3,190,730
INTEGRATED HYDROCARBON
CONVERSION COLUMN
Paul Korwin, Flushing, and George Russell James, Armonk, N.Y., assignors to Chemical Construction Corporation, New York, N.Y., a corporation of Delaware
Filed Aug. 3, 1962, Ser. No. 214,625
6 Claims. (Cl. 23—288)

This invention relates to apparatus for the conversion of fluid hydrocarbons to synthesis gas or hydrogen. A unitary apparatus arrangement is provided, in which the multiple process steps of secondary reform, waste heat recovery, and CO-oxidation are simultaneously carried out.

The process steps involved in the reaction of fluid hydrocarbons such as methane with steam to produce hydrogen or synthesis gas are well known. When ammonia synthesis gas is produced, a stoichiometric proportion of air is employed in the secondary reform step to yield a final gas stream containing hydrogen and nitrogen in a 3:1 ratio. In any case, the initial process stream is a mixture of fluid hydrocarbon and steam. This mixture is pased through the initial or primary reforming stage, which is carried out in a tubular reformer. The tubes are packed with nickel catalyst and externally fired. A primary reform process gas stream is thus produced which contains hydrogen, carbon monoxide, steam and unreacted hydrocarbon.

The primary reformer gas stream is now treated to convert the balance of unreacted hydrocarbon, in a step known as secondary reforming. A stream of oxygen-containing gas, such as air, is reacted with the primary reformed gas stream. This combustion reaction causes a rise in gas stream temperature and some further conversion of hydrocarbon. Residual hydrocarbon is completely reacted by passing the gas stream through a bed of secondary reform catalyst, which is of a nature similar to primary reform catalyst.

The resulting crude synthesis gas is a mixture of hydrogen, carbon monoxide, carbon dioxide and steam. The gas stream is now cooled in heat exchanger means prior to a final stage of reaction known as CO-oxidation. In this final stage, the cooled gas stream is passed through one or more beds of promoted iron oxide catalyst, in order to react carbon monoxide with steam thus yielding further hydrogen.

In the present invention, a unitary apparatus arrangement is provided, in which the several process steps of secondary reform, waste heat recovery and CO-oxidation are carried out in the same process vessel. The invention is characterized by a co-acting arrangement of the several process sections, whereby the process may be carried out in an improved and more efficient manner. As a result of this new arrangement, a compact equipment design is provided with considerably reduced piping, heat losses and cost. Stresses in stainless piping and "hot spots" in the apparatus are eliminated. Finally, due to the unitary apparatus arrangement, the utilization of heat is considerably improved, which results in higher process efficiency.

It is an object of the present invention to produce synthesis gas by means of improved apparatus.

Another object is to produce synthesis gas in a unitary apparatus, in which the several process steps of secondary reform, waste heat recovery and CO-oxidation take place in the same process vessel.

A further object is to provide an improved apparatus for the secondary reforming and subsequent processing of synthesis gas.

An additional object is to provide an apparatus for production of synthesis gas which is unitary, compact, and provides better heat utilization.

Figure 2:
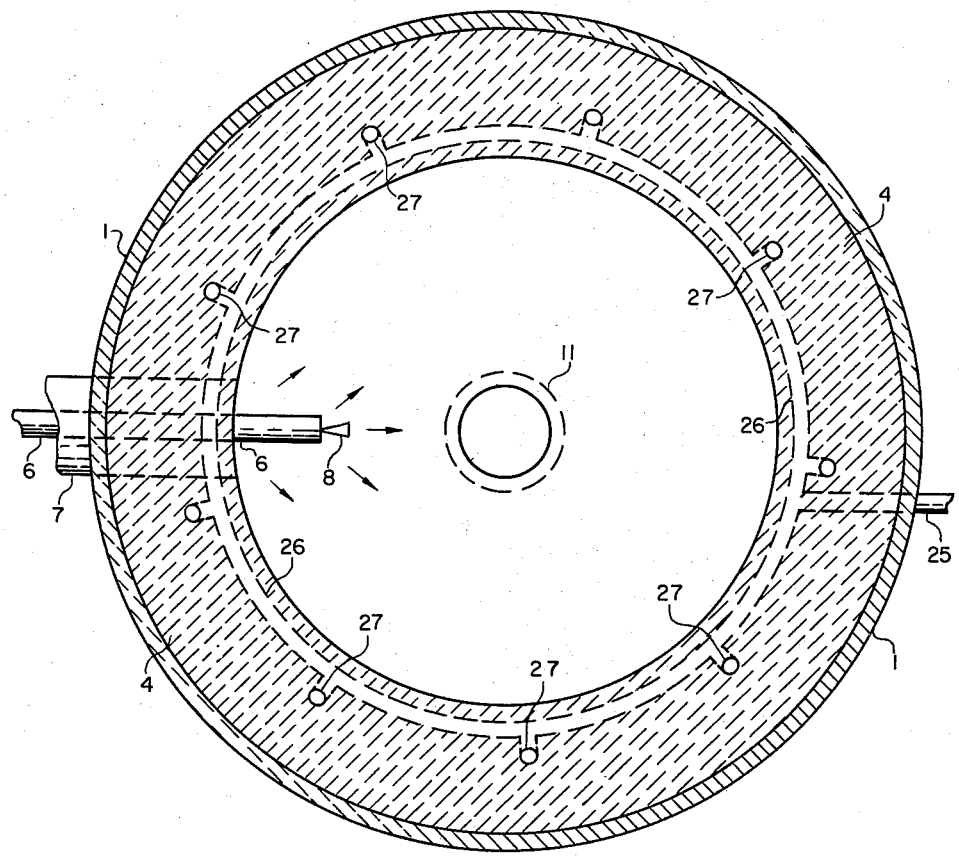

These and other objects and advantages of the present invention will become evident from the description which follows. FIGURE 1 is an overall elevation view of the apparatus, and FIGURE 2 is a sectional plan view in enlarged scale of FIGURE 1, taken on section 2—2. Referring to FIGURE 1, container 1 is a reactor-converter vessel in which the several process stages are mounted and combined. Vessel 1 will preferably be cylindrical in cross-section. Primary reformed gas stream 2 and an oxygen-containing gas stream 3, are directed into the lower furnace section of vessel 1, defined by inner refractory lining 4 and refractory partition 5. Streams 2 and 3 are preferably passed into the furnace section by means of concentric conduits 6 and 7, respectively, although other gas entry means may be provided. Stream 2 will typically be at a temperature of about 1300° F. and pressure of from about 15 p.s.i.g. to 600 p.s.i.g. or more. Internal duct 6 will thus usually consist of stainless steel pipe, which becomes heated and freely expands into the furnace section. A flare cone 8 may be mounted at the outlet of duct 6, to disperse the reformed gas stream 2 and provide more uniform reaction in the furnace section.

Outer conduit 7 will generally consist of a carbon steel pipe. The oxygen-containing gas stream 3, typically consisting of process air, flows in the annular space between conduits 6 and 7 and is preheated by hot pipe 6. The air stream concomitantly acts as insulation between the hot internal conduit or pipe 6 and outer conduit 7, thus permitting the use of carbon steel as a material of construction for conduit 7. Conduit 7 is provided with expansion joint 9. It will be evident that this gas entry arrangement eliminates the problem of costly stainless steel loops or expansion joints, since the internal pipe 6 is freely suspended and thermal expansion merely causes expansion of the pipe into the furnace section.

A mound or barrier 10 consisting of broken refractory is usually provided in the furnace section, to break the kinetic energy of the gas streams thus protecting the opposite refractory wall from hot gas impact. A bottom manhole 11 will usually be included in the apparatus, in order to provide access to the furnace section as well as drainage of any liquid which may condense on shutdown.

The mixed process gases react in the furnace section. The resulting combustion will raise the process gas stream temperature from 1300° F. to about 2000° F. The hot gas stream now rises inside vessel 1, passing upwards through openings in arched partition 5. The gas stream now passes through bed 12 consisting of nickel-promoted secondary reform catalyst. Bed 12 will typically be at a temperature of about 1650° F., and final conversion of unreacted hydrocarbon in the gas stream now takes place. Bed 12 will usually be supported by partition 5, by means such as an intermediate layer of broken refractory or oversized catalyst, not shown, which may be packed in the region between elements 5 and 12. Besides the support function, such a layer will also cushion the impact of hot upflowing process gas, and thus serves to protect the catalyst against movement or fluidization which would result in attrition and grinding of catalyst particles. A retention plate 13 is provided above bed 12, to prevent entrainment of catalyst particles in the gas stream.

Alternatively, a stainless steel screen with a layer of broken refractory may be provided for this purpose. Above plate 13, a spacing or chamber will generally be provided to achieve pressure equalization.

The rising gas stream now passes through a heat exchanger section for cooling and heat recovery. Preferably, the heat exchanger will consist of a waste heat boiler, provided with fire tubes 14 for passage of the hot process gas. Tubes 14 are mounted in refractory partition-mounting 15 by means of stainless steel ferrules 16 or other suitable mounting which prevents thermal shock. The tubes 14 are supported at their upper ends by cover plate tube sheet 17. Plate 17 is preferably dished with a central dome 18, in order to facilitate evacuation of accumulations such as oxygen or carbon dioxide which are generally responsible for corrosion of upper sheets in vertical boilers. Dome 18 also serves to accumulate flashing water, and provides a centralized zone for steam removal from the waste heat boiler water side, external to tubes 14. A central vertical duct 19 is also provided in the waste heat boiler section, together with control valve 20. The purpose of duct 19 is to bypass tubes 14, thereby providing process temperature control.

Generated steam is withdrawn from dome 18 via connecting pipe 21, which passes the steam to outside flashing drum 22. A recirculating piping system such as lines 23 and 24 connects the bottom of steam drum 22 with the lowest part of the boiler, thus passing boiler feed water to the boiler. In a preferable embodiment of the present invention, the boiler feed water is not passed directly to the boiler section via 24, but instead passes via 25 to lower circular header 26 mounted in refractory lining 4. From header 26, a plurality of vertical feed water tubes such as 27 mounted in lining 4 serves to pass the boiler feed water up to the boiler section. This circular row of water tubes 27 serves to cool the refractory lining 4 and prevents the development of hot spots. Tubes 27 may be provided with fins for more rapid extraction of heat from lining 4. Blow-off and drain valve 28 will also be provided in line 25.

Starting with the steam boiler section, the upper part of vessel 1 is provided with external insulation coating 29, to reduce heat losses. Heat loss is reduced in the lower part of vessel 1 due to the inner refractory lining 4. The absence of external insulation allows the utilization of carbon steel for the outer shell. The rising gas stream leaves the boiler section at a typical temperature of 800° F., and is directed by baffles 30 and 31 across hairpin heat exchanger 32 or other suitable heat exchange means. The hot gas stream may be employed at this point to preheat a process gas stream passing through exchanger 32, such as mixed feed gas to the primary reformer.

The gas stream now passes through two beds 33 and 34 consisting of CO-oxidation catalyst, mounted in the top of vessel 1 and provided with interbed cooling via heat exchanger 35 and suitable baffles. In some cases it will be preferable to provide interbed cooling by means of the apparatus of U.S. Patent No. 3,010,807. The gas stream is further reacted in beds 33 and 34 at a typical average temperature of 700° F., with reaction between carbon monoxide and steam leading to further formation of free hydrogen in the gas stream. The final converted gas stream 36 leaves vessel 1 via upper conduit 37, containing principally hydrogen, carbon dioxide and steam.

FIGURE 2 is an enlarged sectional plan view of the furnace section of FIGURE 1, taken on section 2—2, and shows the circular boiler feed water header 26 and the plurality of water tubes 27, mounted in the refractory lining 4.

Numerous alternatives and apparatus equivalents may be provided within the scope of the present invention. Thus, depending on various process considerations, in some cases only one bed of CO-oxidation catalyst may be needed to provide substantially complete conversion of carbon monoxide. Other types of steam boilers or analogous heat exchange apparatus may be provided in place of the fire-tube boiler which represents only the preferred embodiment of the present invention.

What we claim is:

1. Gas reform furnace with integral converter and waste heat boiler comprising a vertically disposed cylindrical vessel, said vessel having a bottom furnace section defined by an inner refractory lining and upper refractory partition, said partition being provided with a plurality of substantially vertical openings for passage of process gas, inlet means below said partition for passage of an oxygen-containing gas and partially reformed synthesis gas into said furnace section, a bed of secondary reform catalyst supported within said vessel above said partition, a waste heat boiler section within said vessel above said catalyst bed, said waste heat boiler section comprising a plurality of substantially vertical fire tubes extending upwards from a bottom refractory-lined mounting to an upper support cover, together with means to pass boiler feed water into said boiler section external to said tubes and steam removal means extending external to said vessel from said cover, said inner refractory lining extending upwards within said vessel to said refractory-lined mounting, a heat exchanger for gas cooling above said waste heat boiler section, a bed of CO-oxidation catalyst supported within said vessel above said heat exchanger, and an upper outlet above said bed of CO-oxidation catalyst for removal of converted process gas from said vessel.

2. Apparatus of claim 1, in which said inlet means for passage of an oxygen-containing gas and partially reformed synthesis gas into said furnace section comprises two concentric conduits, said conduits terminating in said furnace section, together with means to pass one of said gas streams through the annular space between said conduits and means to pass the other gas stream through the inner conduit.

3. Apparatus of claim 2, in which said inner conduit extends into the furnace section beyond said outer conduit.

4. Apparatus of claim 1, in which said means to pass boiler feed water into said boiler section comprises a circular header mounted in said refractory lining below said furnace section, means to pass boiler feed water to said header, and a plurality of water tubes extending upwards from said header and within said refractory lining, said water tubes terminating at said boiler section.

5. Apparatus of claim 1, in which said fire tubes are arranged uniformly about a central vertical bypass duct in said waste heat boiler, said duct extending upwards from below said refractory-lined mounting and terminating above said cover, said duct being provided with valve means for control of bypass gas flow through said duct.

6. Gas reform furnace with integral converter and waste heat boiler comprising a vertically disposed cylindrical vessel, said vessel having a bottom furnace section defined by an inner refractory lining and upper concave refractory partition, said partion being provided with a plurality of substantially vertical openings for passage of process gas, two concentric conduits extending into said furnace section, the outer conduit terminating before the inner conduit whereby said inner conduit extends further into the furnace section, means to pass partially reformed synthesis gas through said inner conduit, means to pass an oxygen-containing gas through the annular space between said conduits, a bed of secondary reform catalyst supported within said vessel above said partition, a waste heat boiler section wtihin said vessel above said catalyst bed, said waste heat boiler section comprising a central vertical bypass duct extending upwards from a bottom refractory lined mounting to an upper cover and provided with valve means for control of bypass gas flow, together with a plurality of substantially vertical fire tubes extending upwards from said mounting to said cover, means to pass boiler feed water into said boiler section and external to said tubes comprising a circular header mounted in said refractory lining below said furnace section together with means to pass boiler feed water to said header and a plurality of water tubes extending upwards from said header and within said refractory lining to said boiler section, a steam removal duct extending external to said duct from said cover, a heat exchanger for gas cooling above said waste heat boiler section, a bed of CO-oxidation catalyst supported within said vessel above said heat exchanger, and an upper outlet above said bed of CO-oxidation catalyst for removal of converted process gas from said vessel.

References Cited by the Examiner

UNITED STATES PATENTS

| 1,551,235 | 8/25 | Brownlee et al. | 23—212 |
| 2,537,708 | 1/51 | Scharmann | 23—212 |
| 2,815,007 | 12/57 | Sprague et al. | 23—227 XR |

FOREIGN PATENTS 417,829  10/34  Great Britain.

MORRIS O. WOLK, *Primary Examiner.*

MAURICE A. BRINDISI, *Examiner.*